United States Patent

[11] 3,623,017

[72] Inventors William P. Lowell
St. Paul;
Harry W. Moore, III, St. Croix Beach, both of Minn.
[21] Appl. No. 868,546
[22] Filed Oct. 22, 1969
[45] Patented Nov. 23, 1971
[73] Assignee Sperry Rand Corporation
New York, N.Y.

[54] DUAL CLOCKING ARRANGEMENT FOR A DIGITAL COMPUTER
4 Claims, 4 Drawing Figs.

[52] U.S. Cl. .......... 340/172.5
[51] Int. Cl. .......... G06f 9/00
[50] Field of Search .......... 340/172.5; 235/157

[56] References Cited

UNITED STATES PATENTS

Re. 26,087 9/1966 Dunwell et al. .......... 340/172.5
2,840,305 6/1958 Williams et al. .......... 340/172.5

*Primary Examiner*—Gareth D. Shaw
*Attorneys*—Thomas J. Nikolai, Kenneth T. Grace and John P. Dority

ABSTRACT: In most general purpose digital computers, there are some instructions that require a relatively long execution time. Some examples of these extended sequence instructions would be multiply, divide, square root, etc. When starting the execution of this type of instruction, it is necessary to interrupt the normal timing of the computer and to implement an "arithmetic hold" condition which, in effect, keeps the computer from fetching a new instruction while the extended sequence instruction is being executed. In the present invention, two 4-phase different-speed clocks are utilized. The pulse repetition rate of the first low-speed clock may be substantially less than that of the second high-speed clock. Suitable control circuits are provided for sensing when an extended sequence-type instruction is involved and for switching in the high-speed clock such that the extended sequence instruction is executed at a higher rate than is a normal instruction.

INVENTORS
WILLIAM P. LOWELL
HARRY W. MOORE, III
BY Thomas J. Nikolai
ATTORNEY

DUAL CLOCKING ARRANGEMENT FOR A DIGITAL COMPUTER

BACKGROUND OF THE INVENTION

In most computers, there are some instructions that require a relatively long execution time. These instructions are commonly referred to as "extended sequence instructions." Typical examples of this type of instruction would be multiply, divide, square root, etc. During the execution of this type of instruction by the arithmetic section of the computer, it is necessary to interrupt the normal timing of the computer until the extended sequence instruction has been completed. This interruption is referred to an an "arithmetic hold" condition. When the computer is in this condition, a new instruction cannot be read out from the memory to the instruction register in the control section of the computer. Thus, it is advantageous to speed up the operation of the computer when it is in the arithmetic hold condition.

In the present invention, this is accomplished by utilizing a high-speed clock when an extended sequence type of instruction is being processed. When a normal instruction such as an add, subtract, store, transfer, etc. is being processed, the low-speed clock is operational. As a result, the overall speed of the computer is increased.

SUMMARY OF THE INVENTION

In accordance with the preferred embodiment of the invention, the control section of the computer includes the conventional components such as the instruction register, the instruction indexing circuits, the instruction decoders and the conventional or normal clock-pulse generator. It further includes the logic circuits for combining the outputs from the clock network and from the instruction decoders for producing the command enables which control the operation of the arithmetic section of the computer. In addition to this conventional circuitry, the control section of the computer comprising the preferred embodiment includes a second clock pulse generator that operates at approximately three times the pulse repetition rate of the normal clock-pulse generator. Further, the control section of the preferred embodiment includes a switching network that is responsive to the output from the instruction decoders and that serves to connect either the high-speed clock pulse generator or the low-speed clock pulse generator to the system depending upon the type of instruction being decoded. When the instruction being decoded constitutes an extended sequence instruction, the switching network connects the output from the high-speed clock-pulse generator into the control logic circuit so that the command enable signals for the arithmetic section are produced at a faster rate. However, when the instruction decoders determine that a normal instruction is to be executed, the switching network connects the low-speed clock pulse generator into the system.

It is accordingly the primary object of this invention to provide an improved control section for a general purpose digital computer.

It is another object of this invention to provide in a general purpose digital computer, suitable circuits for enhancing the speed of operation of the computer.

It is still a further object of this invention to provide a second clock-pulse generator that permits the arithmetic section of the computer to run asynchronously during an "arithmetic hold" condition, allowing other functions to be carried out at the normal rate at the same time.

DESCRIPTION OF THE DRAWINGS

The invention will best be understood with reference to the accompanying drawings, together with the following detailed description of a preferred embodiment thereof.

In the drawings.

DESCRIPTION OF THE PREFERRED EMBODIMENT

Figure 1:
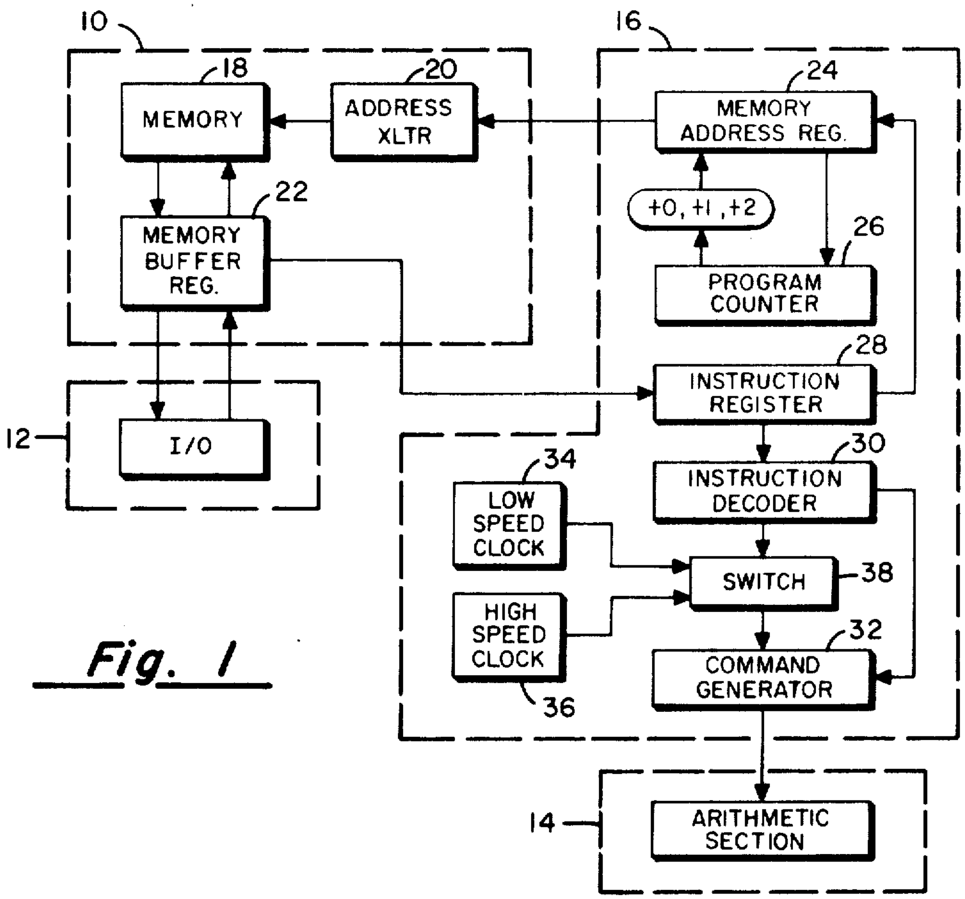
FIG. 1 is a block diagram of the preferred embodiment of the invention.

Referring now to FIG. 1, there is shown in block diagram form the organization of a digital computer incorporating the present invention. As is illustrated, the computer comprises four main sections, namely: the Memory Section shown enclosed by dashed line 10; the Input-Output Section shown enclosed by dashed line 12; the Arithmetic Section shown enclosed by dashed line 14; and, the Control Section shown enclosed by dashed line 16. The Memory Section 10 includes a random access storage device such as a magnetic core memory 18, an address translator 20 and a memory buffer register 22. The address translator receives, as an input, a memory address and decodes the bits of the memory address to uniquely select a particular register or word in the memory 18. During a "read" operation, the word so selected is read out into the memory buffer register 22 where it becomes available to the remainder of the computer.

The Input-Output section 12 includes the interface circuitry for enabling a plurality of different peripheral devices to be connected to the computer system. Thus, such things as magnetic tape units, printers, storage drums etc. can be connected into the system in the conventional manner.

The Arithmetic Unit 14 is that part of the computer that performs numeric and logical calculations. The various registers and adding network contained in the Arithmetic Section 14 operate in response to commands called "command enables" provided by the Control Section 16 of the computer to carry out the operation defined by the particular instruction undergoing execution.

The Control Section 16 of the computer includes a memory address register 24 that at least temporarily holds the address of a register in the memory 18 where a word is to be obtained or stored. Further, the Control Section commonly includes a program counter 26 which is the device that keeps track of the particular instruction undergoing execution. This counter 26 has incrementing properties so that upon the execution of a current instruction the contents of this counter can be incremented to supply the address of the next instruction to be obtained and executed.

Proceeding on with a description of a typical computer that may incorporate the present invention, the Control Section 16 will include an instruction register 28 which is the register that temporarily stores each instruction while it is undergoing execution. The output of the instruction register 28 is connected to an instruction decoder 30 that is a device which examines the operation code portion of an instruction word in the instruction register 28 to generate signals indicative of the type of instruction contained in the instruction register 28. Further, the address portion of the instruction register 28 is connected to the memory address register 24 so that operands can be fetched from the memory 18 at the appropriate point in the cycle. The output signals from the instruction decoder 30 are applied as a first input to the command generator 32. The command generator 32 is the device that normally combines the decoded bits (the function code) of the instruction register 28 with the timing signals provided by the clock to produce the command enable signals which go out to the various portions of the computer to effect the execution of the instruction. As shown in FIG. 1, the command enable signals from the command generator 32 are shown as being connected to the Arithmetic Section 14; however, it is to be understood that these command enable signals may also go to the Input-Output Section 12 and elsewhere depending upon the nature of the instruction being executed. It is to be further understood that the Control Section 16 of the computer may further include index registers and index selection registers (not shown) that are commonly used to modify the address portion of the instruction word as determined by the programmer.

Thus far, the apparatus described is quite conventional. The invention resides in the adoption of a dual clocking arrangement for the computer described. More specifically, the Control Section 16 of the computer is shown to include a first low-speed clock 34 and a second high-speed clock 36 that provide timing signals to first and second inputs of an electronic switching network 38. The switching network 38 receives an output from the instruction decoder 30 and, depending upon the permutation of the bits comprising the function code portion of the instruction word currently undergoing execution, the switch 38 will connect either the low-speed clock 34 or the high-speed clock 36 into the command generator network 32. For example, when an extended sequence type instruction such as a multiply instruction, a divide instruction, etc. is undergoing execution, the instruction decoder 30 will provide a suitable output to the switch 38 so that the high-speed clock 36 will be effective to produce command enable signals at a substantially higher rate than if the low-speed clock 34 is effective.

Figure 2:
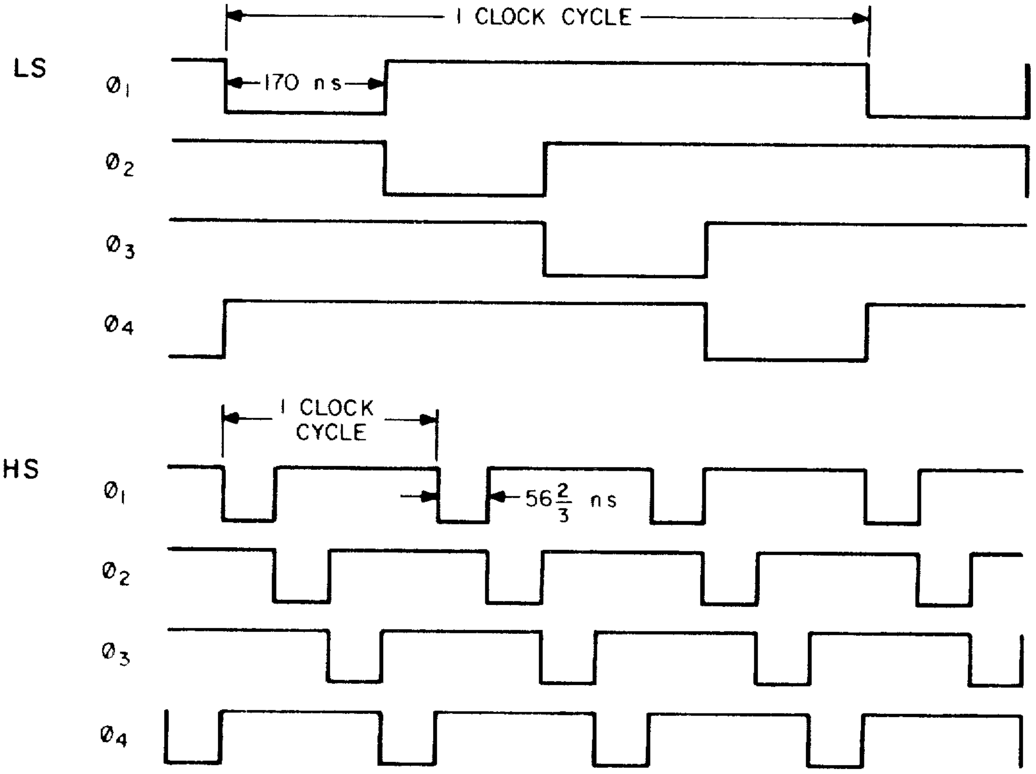
FIG. 2 illustrates typical waveforms produced by the high-speed and low-speed clock-pulse generators utilized in the preferred embodiment.

In FIG. 2 there are illustrated exemplary waveforms produced by the low-speed clock 34 and the high-speed clock 36 respectively. In this arrangement, one complete clock cycle of the low-speed clock 34 may be 680 nanoseconds whereas the high-speed clock 36 may operate at a 226 2/3 nanosecond rate. In other words, the high-speed clock operates three times as fast as the low-speed clock.

Figure 3:
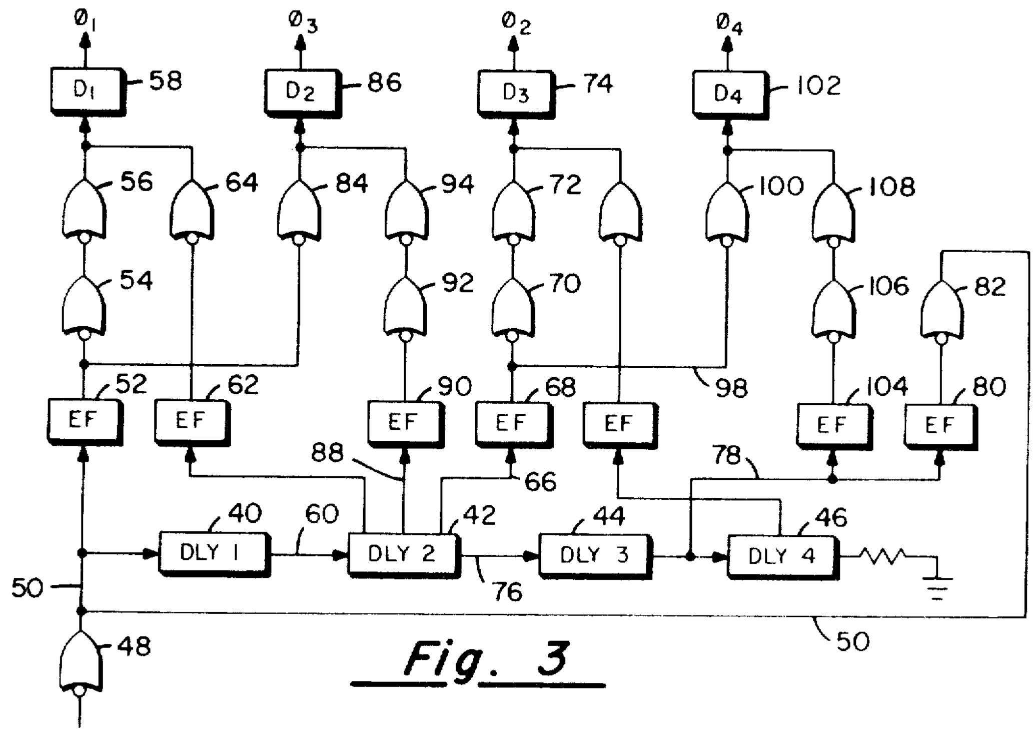
FIG. 3 is a logic diagram showing the construction of a suitable clock which may be used in implementing the preferred embodiment of FIG. 1.

Shown in FIG. 3 is a timing network that can be used to implement the low-speed clock 34 or the high-speed clock 36 illustrated in the block diagram of FIG. 1. The speed of operation of the clock is determined by the parameters of the delay elements 40, 42, 44, and 46.

In operation, if a logical "0" is applied to the NOR-circuit 48, a logical "1" signal is applied by way of conductor 50 to the input of delay 40 and also to the input of emitter follower 52. The signal passes through emitter follower 52, is inverted twice by NOR-circuits 54 and 56 to enable the driver 58 circuit 58. The driver provides the Phase-1 clock output to all clocked circuits in the computer. After a time period determined by the perameters of delay element 40, a logical "1" signal appears at its output 60 and is supplied as an input to the delay element 42. After a predetermined time, this produces a logical "1" output to emitter follower 62. This signal is inverted by NOR-circuit 64 and is used to cut out the Phase-1 signal. Next, a "1" signal comes out of delay element 42 on line 66 and is applied to the input of emitter follower 68. The "1" output signal from this emitter follower is inverted twice by NOR-circuits 70 and 72 and enables driver 74 to generate the Phase-2 clock signal. The logical output signal from delay element 42 appearing on line 76 is applied to delay element 44 and after a predetermined delay period, a logical "1" signal appears on conductor 78 and is applied to emitter follower 80. The output from emitter follower 80 is inverted by NOR-circuit 82 and fed back via conductor 50 and at this time is applied as a "0" signal to delay element 40 and emitter follower 52. The "0" output from emitter follower 52 is inverted through NOR-circuit 84 to produce a "1" signal which enables driver 86 to produce the Phase-3 clock signal. The "0" input to delay element 40 produces a "0" output on conductor 60 as well as a "0" output on conductor 88. This signal passes through emitter follower 90 and inverted twice by NOR-circuits 92 and 94 to produce a "0" signal on conductor 96 to cut off driver 86. The "0" output from delay element 42 appearing on conductor 66 passes through emitter follower 68 and is applied over conductor 98 to the input of NOR-circuit 100. The logical "1" output signals from NOR-circuit 100 enables driver 102 to produce the Phase-4 clock signal. The "0" output from delay element 42 appearing on conductor 76 is further delayed by element 44 and applied by way of conductor 78 to the input of emitter follower 104. The resulting "0" output signal from emitter follower 104 is inverted twice by NOR-circuits 106 and 108 and is used to cut off the driver 102 and terminate the Phase-4 signal. The "0" output signal from delay element 44 is inverted by NOR-circuit 82 to a "1" signal and applied by way of conductor 50 back to the input of delay element 40. The logical "1" input to delay element 40 starts the process all over again.

Thus it can be seen that the circuits shown in FIG. 3 can be used to generate the waveforms illustrated in FIG. 2.

Figure 4:
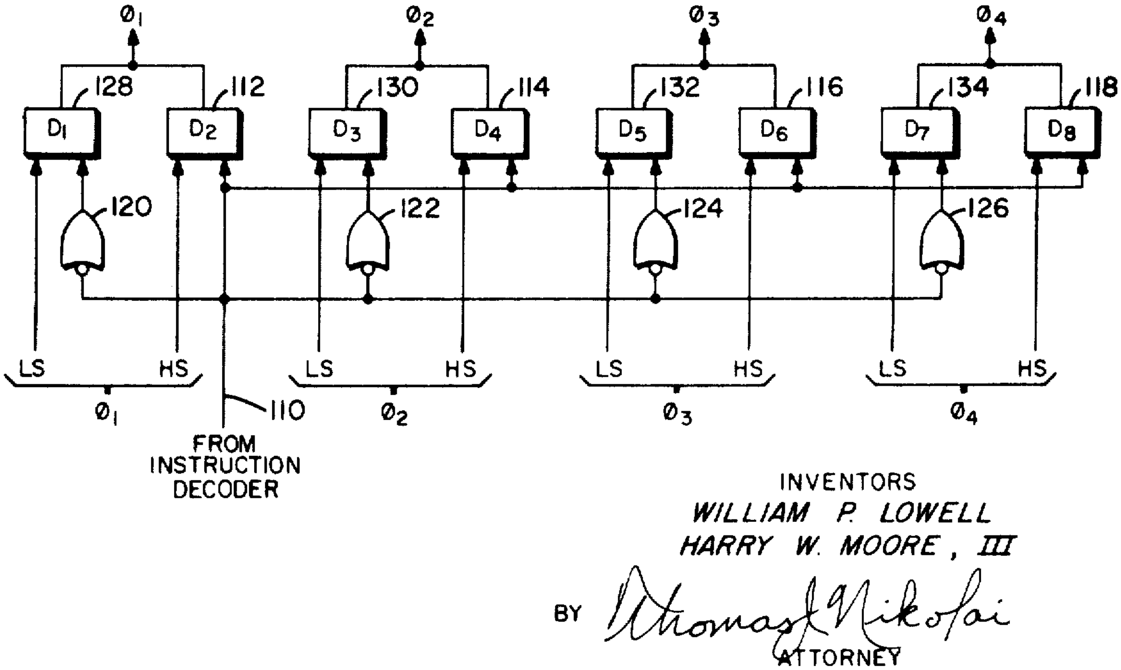
FIG. 4 illustrates a suitable switching network for implementing the invention.

FIG. 4 illustrates a circuit which can be used to implement the switch 38 of FIG. 1. This switch network receives a control signal from the instruction 30 decoder via line 110. The signal on this line identifies whether the instruction undergoing execution is a so-called extended sequence instruction such that the computer is placed in the arithmetic hold condition. The switch network of FIG. 3 also receives as inputs, the outputs from the low-speed clock (LS) and the high-speed clock (HS). When a logical "1" signal is applied to the conductor 110, the drivers 112, 114, 116, and 118 are enabled such that the Phase 1 through Phase 4 signals of the high-speed clock 36 are applied to the command generator 32. At the same time, this "1" signal on line 110 is inverted by the NOR-circuits 120, 122, 124 and 126 such that "0" signals are applied to drivers 128, 130, 132, and 134. This disables the Phase-1 through Phase-4 clock 34 signals from the low-speed clock.

When a "0" is applied to the control line 110 drivers 112, 114, 116 and 118 are disabled thereby cutting off the high-speed clock 36. The "0" signal applied to control line 110 is inverted by NOR-circuits 120, 122, 124 and 126 and enables the drivers 128, 130, 132, and 134 thereby passing the Phase-1 through Phase-4 output of the low-speed clock 34 to the command generator 32.

Thus it can be seen that we have provided a novel arrangement for use in the control section of a general purpose digital computer whereby extended sequence-type instructions can be executed at a faster-than-normal rate.

Having thus described our invention, what is claimed is:

1. In a digital computer having a memory section for storing operands and instructions, said instructions being of first and second types, an input-output section, an arithmetic section an improved control section comprising;

an instruction register for at least temporarily storing an instruction;

decoding means adapted to receive signals from said instruction register for producing a first control signal when the instruction in said instruction register is of said first type and a second control signal when the instruction in said instruction register is of said second type;

first and second clock pulse signal generating means, said second clock pulse signal generating means having a pulse repetition rate substantially greater than that of said first clock pulse signal generating means; and switching means controlled by said first and second control signal adapted to receive the output signals from said first and second clock-pulse signal-generating means for selectively applying the output from said first or second clock-pulse signal-generating means to said arithmetic section such that instructions of said second type will be executed at a substantially greater rate than instructions of said first type.

2. In a digital computer having a memory section for storing instructions of first and second types, an input-output section, an arithmetic section, an improved control section comprising:

means for at least temporarily storing an instruction;

means coupled to said instruction storing means for producing a first control signal when the instruction in said instruction storing means is of said first type and a second control signal when the instruction in said instruction storing means is of said second type;

first and second clock-pulse signal-generating means, said second clock-pulse signal-generating means having a pulse repetition rate substantially greater than that of said first clocktpulse signal-generating means; and switching means controlled by said first and second control signal adapted to receive the output signals from said first and second clock-pulse signal-generating means for selectively applying the output from said first or second clock-pulse signal-generating means to said arithmetic section such that instructions of said second type will be executed at a substantially greater rate than instructions of said first type.

3. In a digital computer having a memory for storing operands and instructions, said instructions being of first and second types, and an arithmetic section, an improved control section comprising:

means for storing instruction words read out from said memory means connected to said instruction storage means for producing a predetermined signal when said instruction is of said first type first and second clock-pulse generators for producing clock-pulse signals for said computer at first and second rates respectively command generator means adapted to receive regularly occurring clock pulse signals and signals determined by said instruction word for producing command enable signals for controlling the operation of said computer switching means connected to receive the output from said first and second clock-pulse generators controlled by said predetermined signal for selectively connecting the clock-pulse signals to said command generator such that said command enable signals are produced at differing rates depending upon the type of instruction undergoing processing.

4. Apparatus as in claim 3 wherein said first clock-pulse generator has a pulse repetition rate in the range of 3 to 5 times that of said second clock-pulse generator.

* * * * *